J. Sellors,

Horse Collar Cap.

No. 102,052. Patented Apr. 19. 1870.

Attest.
N. S. Sprague
James Thierry

Inventor.
John Sellor
Per Attorney
Thos. S. Sprague

United States Patent Office.

JOHN SELLORS, OF BELLEVUE, MICHIGAN.

Letters Patent No. 102,052, dated April 19, 1870.

IMPROVED HORSE-COLLAR CAP.

The Schedule referred to in these Letters Patent and making part of the same.

*To whom it may concern:*

Be it known that I, JOHN SELLORS, of Bellevue, in the county of Eaton and State of Michigan, have invented a new and useful Improvement in Horse-collar Caps; and I do declare that the following is a true and accurate description thereof, reference being had to the accompanying drawings and to the letters of reference marked thereon, and being a part of this specification, in which—

Figure 1:
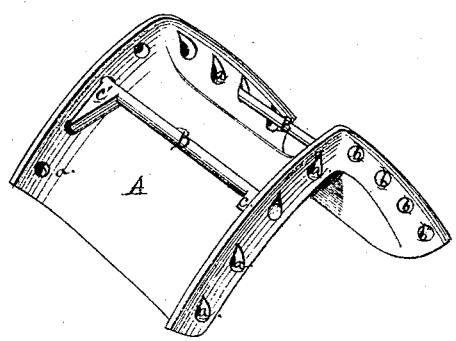
Figure 2:
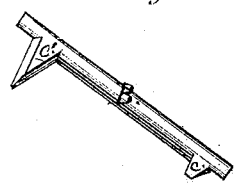

Figure 1 is a perspective view of my cap, and
Figure 2 is a detached view of the key-bar.
Like letters indicate like parts in each figure.

The nature of this invention relates to the construction of a horse-collar cap in such a manner that it prevents the wearing, galling, or cutting, and gives the animal free use of all the muscles of the neck.

It consists in constructing a saddle-shaped cap, of suitable material, which is placed over the horse's neck at the top of the collar, and in key-bars to which the collar is attached, as hereinafter more fully set forth.

In the drawings—

A represents my collar-cap, constructed of malleable iron, or other suitable material, and of a saddle-shape, having in its upward projecting side a series of elongated openings, $a$, and circular openings, $b$, for the purposes hereinafter specified.

The collar with which this cap is used must be open at its upper end, as in that manner of construction it can be adjusted to horses' necks much quicker than when it has to be pushed over the head and turned.

B are key-bars, having the projecting spurs $c\ c'$; between these spurs, and to the bars are attached the upper ends of the collar by leather binding, or other means.

After the collar has been adjusted to the neck of the animal, the cap is secured in place by passing the smaller end of the bar and spur $e$ through the elongated opening $a$, which will allow the other end of the bar to enter the circular openings $b$ directly opposite; the bar is then slightly turned, so that the spurs will be on the inside or between the sides of the cap.

Having a series of openings, $a\ b$, as shown, it will readily be seen that the cap can be used on large or small horses by the insertion of the key-bars into the openings, as may be required.

What I claim as my invention, and desire to secure by Letters Patent, is—

The saddle-shaped cap A, provided with the openings $a\ b$, and the key-bars B, provided with the spurs $c\ c'$, as and for the purpose set forth.

JOHN SELLORS.

Witnesses:
CHARLES VIELE,
E. M. KINGSBURY.